United States Patent [19]

Pedersen

[11] 4,300,401
[45] Nov. 17, 1981

[54] METHOD AND APPARATUS FOR DETERMINING FLUID FLOW

[75] Inventor: Norman E. Pedersen, Wilmington, Mass.

[73] Assignee: Panametrics, Inc., Waltham, Mass.

[21] Appl. No.: 82,820

[22] Filed: Oct. 9, 1979

[51] Int. Cl.³ .............................................. G01F 1/66
[52] U.S. Cl. ................................ 73/861.31; 364/510
[58] Field of Search .................... 73/861.31; 364/510, 364/575

[56] References Cited

U.S. PATENT DOCUMENTS

| | | | |
|---|---|---|---|
| 3,564,912 | 2/1971 | Malone et al. | 73/861.31 |
| 3,940,985 | 3/1976 | Wyler | 73/861.31 |
| 4,024,760 | 5/1977 | Estrada, Jr. | 73/861.31 |
| 4,102,186 | 7/1978 | Brown | 73/861.31 |
| 4,109,523 | 8/1978 | Teyssandier | 73/861.31 |

OTHER PUBLICATIONS

S. G. Fisher, et al.—"Ultrasonics as a Standard for Volumetric Flow Measurement"—1972—pp. 139-159.

*Primary Examiner*—Charles A. Ruehl
*Attorney, Agent, or Firm*—Kenway & Jenney

[57] ABSTRACT

A method and apparatus for determining volumetric fluid flow rate in an arbitrarily shaped fluid conveyance are disclosed. A plurality of functions, $f_j(p,m_k)$ (where p is a position in the conveyance and $m_k$ depends upon the Reynolds number of the fluid flow), each function being approximately representative of the fluid flow velocity across the conveyance, are linearly combined to approximate the velocity, $P(p)$, of the fluid flow at any point in a plane normal to fluid flow. The scalar constants $A_{j,k}$, of the linear combination $$P(p) = \sum_{j,k} A_{j,k} f_j(p,m_k),$$

are estimated by solving a system of linear equations, $$\bar{v}_i = \sum_{j,k} A_{j,k} \int_{y_i} f_j(p,m_k)$$

in which acoustical measurements along the paths $y_i$ through the conveyance provide an estimate, $v_{meas(i)}$, of the actual average velocity $v_i$ at paths $y_i$. The average fluid velocity and hence volumetric flow across the conveyance can then be determined by taking an area integral of the linear combination $$\sum_{j,k} A_{j,k} f_j(p,m_k).$$

14 Claims, 3 Drawing Figures

METHOD AND APPARATUS FOR DETERMINING FLUID FLOW

The invention relates generally to a method and apparatus for determining fluid flow in a conveyance and in particular to a method and apparatus for determining fluid flow from measured acoustical transit times through the conveyance.

BACKGROUND OF THE INVENTION

The measurement of fluid flow velocities and hence volumetric flow in a fluid conveyance has often been a perplexing problem. The primary source of difficulty is that many measurement procedures disturb the fluid flow profile so that an accurate measurement of the "original" or undisturbed fluid flow cannot be made. Other methods, which probably do not disturb the fluid flow profile (for example Wyler, U.S. Pat. No. 3,940,985, issued Mar. 2, 1976, and Malone et al, U.S. Pat. No. 3,564,912, issued Feb. 23, 1971), are based upon arbitrarily selected, substantially inflexible, approximations and analytical techniques which may unknowingly, under some circumstances, provide somewhat inaccurate measurements which would be unacceptable in commercial practice.

The principal applications for measuring fluid flow rate are oil and gas flows through pipelines extending between supplier and customer, industrial applications where an accurate determination of fluid flow rate is necessary, and in some experimental laboratory situations in which an accurate measurement of flow is important. In each of these applications, errors on the order of 1% may be unacceptable.

The principal object of this invention is therefore an accurate flow rate determining apparatus and method which is accurate under substantially all operating conditions. Other objects of the invention are an apparatus and method having high reliability, substantially low instrumentation costs, a large degree of flexibility in the placement of the measurement equipment, and providing a consistent and repeatable measurement based upon the physical parameters of the fluid flow system.

SUMMARY OF THE INVENTION

The invention relates to a method and apparatus for determining average fluid velocity across a reference plane of a fluid conveyance. The method features the step of selecting a plurality of functions, $f_j(p,m_k)$, which each represent an approximation of the fluid flow velocity profile $P(p)$ of the fluid traversing the reference plane, where $p$ defines a position in the plane and each $m_k$ is a function of the Reynolds number. The method further features the step of approximating the flow velocity by combining the functions in a linear equation of the form $$P(p) = \sum_{j,k} A_{j,k} f_j(p,m_k)$$

where each $A_{j,k}$ is an unknown scalar constant and $j$ and $k$ are positive integers over which the summation is taken. The method further features the step of measuring the time durations for acoustical sounds to travel upstream and downstream along each of a plurality of upstream-downstream straight line paths, each path extending between an upstream wall position of the conveyance and a downstream wall position of the conveyance, the number of known paths being not less than the multiplicative product of $j$ and $k$. The method further includes the step of determining the measured average velocity, vel. meas(i), of fluid flow for each of the flow paths from the measured time durations. The unknown constants $A_{j,k}$ are then determined by forming a system of simultaneous equations having the form $$\text{vel. meas}(i) = \int_{P_i} P(p)dp = \sum_{j,k} \frac{A_{j,k}}{PL_i} \int_{P_i} f_j(p,m_k)dp$$

(where $PL_i$ is the length of the $i^{th}$ path, $P_i$ defines the $i^{th}$ known path, and the integral is a line integral along the path $P_i$) and solving the system of simultaneous equations for the $A_{j,k}$ by substituting the determined measured values of average velocity, vel. meas(i), and path length, $PL_i$, in the system of simultaneous linear equations, evaluating the line integrals along flow paths, and solving for the $A_{j,k}$. The average flow velocity across the plane is then evaluated from the equation $$\overline{V} = \sum_{j,k} \frac{A_{j,k}}{PA} \int_{\text{Area}} f_j(p,m_k)dp$$

where PA is the area of the reference plane bounded by the conveyance and the integral is taken over the area of the reference plane bounded by the fluid conveyance.

In preferred embodiments of the method of the invention, the fluid conveyance has a circular internal cross section, the paths lie in parallel planes, and the functions $f_j(p,m_k)$ are:

$$f(p,m_k) = 5.6\, V_T(m_k)\left[1 + \log\frac{(R-p)V_T(m_k)}{\eta}\right] \text{ where}$$

$V_T$ is an empirically determined pseudo-velocity near the conveyance wall which depends on the Reynolds number of the fluid, $\eta$ is the viscosity of the fluid, $p$ is the distance from the center of the pipe, and $R$ is the radius of the pipe.

The apparatus of the invention features a plurality of transducer pairs, each transducer being positioned in the boundary walls of the fluid conveyance for emitting and receiving acoustical signals, and each transducer pair spans a longitudinal section of the conveyance. A synchronizing control element selectively operates and controls the transducer pairs in a predetermined sequence for producing or emitting generated acoustical signals from each transducer and for receiving the emitted acoustical signals with the other transducer associated with the selected transmitting transducer. The apparatus further includes means for repeatedly measuring the transit time durations and for determining, from the upstream and downstream acoustic signal transit time durations for each transducer pair, a measure of the average fluid flow velocity, vel. meas(i), for each straight line path associated with and extending between each of the transducer pairs. The apparatus further includes means responsive to the determining means for solving a system of simultaneous equations having the general form $$\text{vel. meas}(i) = \sum_{j,k} \frac{A_{j,k}}{PL_i} \int_{P_i} f_j(p,m_k)dp$$

for the $A_{j,k}$, where $A_{j,k}$ are unknown scalar constants, $PL_i$ is the path length of the $i^{th}$ path between the $i^{th}$ pair of transducers, $f_j(p,m_k)$ represents a plurality of approximations of the flow velocity profile of the fluid traversing the member, p is position in the reference plane of the conveyance, $m_k$ is a function of the Reynolds number of the fluid, and the integral is a line integral taken along the $i^{th}$ straight line path. The apparatus further includes means responsive to the solving means for evaluating an equation of the form $$\overline{V} = \sum_{j,k} \frac{A_{j,k}}{A} \int_{Area} f_j(p,m_k)dp$$

where V is the average velocity across the reference plane normal to the fluid flow path, A is the cross-sectional area of the conveyance, and the integral is taken across the area of the conveyance. Thereby, the average fluid flow velocity across the reference plane is calculated.

In a preferred aspect of the invention, the straight line paths lie in parallel planes, and the parallel planes are further parallel to a longitudinal reference plane passing through a center flow axis of the fluid conveyance.

In another aspect of the invention, the planes are spaced unequal distances from the longitudinal reference plane and the distances are arbitrarily chosen.

Preferably, the functions used in connection with the apparatus, $f_j(p,m_k)$, are the same functions used in connection with the method of the invention.

DESCRIPTION OF THE DRAWINGS

Other objects, features and advantages of the invention will appear from the following description of a preferred embodiment of the invention taken together with the drawings in which.

DESCRIPTION OF A PREFERRED EMBODIMENT

Figure 1:
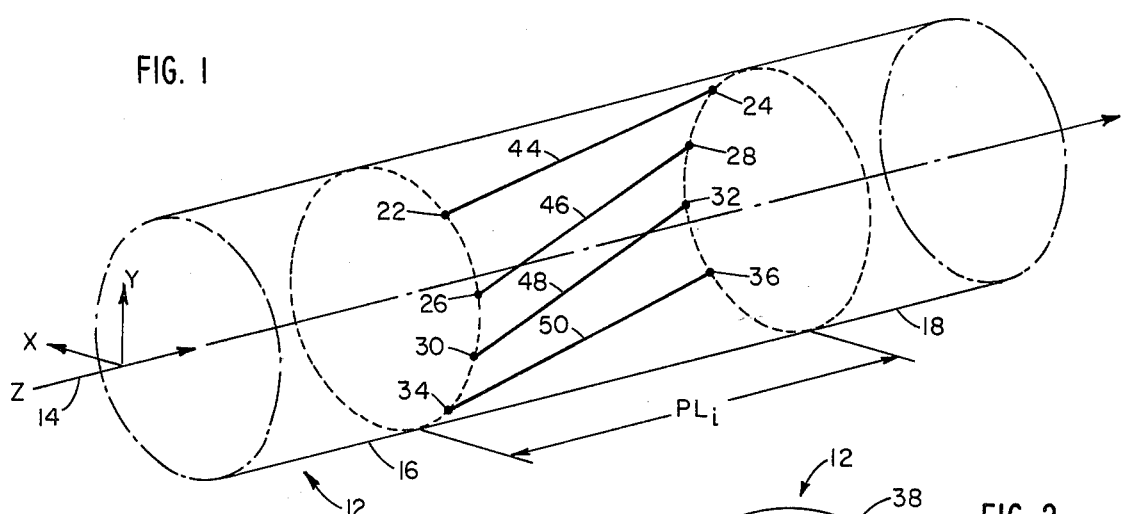
FIG. 1 is a perspective representation to show a typical placement of the acoustical transducers in a fluid conveyance.

Referring to FIG. 1, a fluid conveyance 12, illustrated as a pipeline section having a circular interior cross-sectional area of radius "R" in a plane normal to a longitudinal fluid flow axis 14, extends in the longitudinal direction parallel to the flow axis. The Z axis, of a constructed X,Y,Z coordinate system, coincides in the illustrated embodiment with the flow axis 14. The illustrated pipeline section is a straight-line portion of the longer conveyance which in general will include curved sections as well. A fluid flows through the conveyance in the direction of the Z axis; and the direction of fluid flow defines an upstream portion 16 of the pipeline section and a downstream portion 18 of the pipeline section.

According to the invention, a plurality of transducer pairs 22,24; 26,28; 30,32; and 34,36 are securely positioned in a fluid-tight connection in or to a wall 38 defining the boundary of the fluid conveyance. The transducers and their respective mountings do not interfere or alter the fluid flow pattern or profile as the fluid passes the plural transducer locations. The transducers are preferably positioned, in the illustrated embodiment, at wall locations whereby straight lines drawn between each pair of upstream and downstream transducers lie within planes parallel to each other and to an X—Z plane 40 through the flow longitudinal axis 14.

Figure 2:
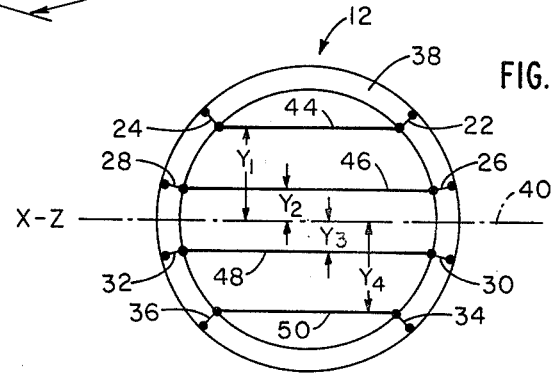
FIG. 2 is an end view taken along the z axis of FIG. 1.

To gain a clearer understanding of the positions of the illustrated transducers of FIG. 1, the established X,Y,Z coordinate system is oriented so that the X axis is parallel to the horizontal plane, the Z axis, as noted above, is in the direction of the fluid flow, and the Y axis extends in a direction normal to the X—Z plane 40 (FIG. 2). Thus, the X—Z plane 40 divides the pipeline fluid conveyance 12 into two equal volume sections; and in the preferred embodiment of the invention, each of the illustrated construction lines 44, 46, 48, 50, connecting paired transducers 22-24, 26-28, 30-32, 34-36, respectively, are parallel to the X—Z plane 40 and thus are respectively known constant distances $y_1$, $y_2$, $y_3$ and $y_4$ from the X—Z plane.

Illustrated transducers 22, 24, 26, ..., 36 may be any of those devices well known in the art, which can be used for both transmitting a pulse of acoustic energy and for transducing a received pulse of acoustic energy to an electrical signal. They may be, for example, type model No. FM-0.5 BA manufactured by Panametrics, Inc.

According to the method of the invention, measurements are made of the upstream and downstream transit times for an acoustical signal pulse traveling between the plurality of acoustical transducer pairs along the known line paths 44, 46, 48, and 50. From the measured time durations, an average fluid velocity along each path can be determined, the determined average velocity, $v_{meas(i)p}$, along the $i^{th}$ path, being equal to $$\overline{v}_{meas(i)p} = \frac{L_i(t_{i1} - t_{i2})}{2 t_{i1} t_{i2}} \quad \text{(EQUATION 1)}$$

where, for each path i, $t_{i1}$ is the upstream transit time, $t_{i2}$ is the downstream transit time, and $L_i$ is the length of the $i^{th}$ path between the $i^{th}$ pair of transducers. Thus, the average longitudinal flow velocity, parallel to the Z axis, is:

$$\overline{v}_{meas(i)} = \overline{v}_{meas(i)p}/\cos\theta_i = \frac{L_i(t_{i1} - t_{i2})}{2 t_{i1} t_{i2} \cos\theta_i} \quad \text{(EQUATION 1A)}$$

where $\theta_i$ is the acute angle between the $i^{th}$ path and a construction line intersecting the path and parallel to the longitudinal fluid flow axis.

According to the invention, the determination of the average velocity of the fluid across the entire area of the fluid conveyance is determined, using the measured values $v_{meas(i)}$ noted above, as follows. A family of functions, $f_j(p,m_k)$, which represent an approximation of the flow velocity profile of the fluids transversing the conveyance in the Z direction, are combined in a linear equation to represent the actual flow P(p) as follows:

$$P(p) = \sum_{j,k} A_{j,k} f_j(p,m_k) \quad \text{(EQUATION 2)}$$

where $A_{j,k}$ are scalar constants, j and k are integers over which the summation is taken, p is the two-dimensional position coordinate in a plane normal to the fluid flow, and $m_k$ is a parameter characteristic of the flow and dependent upon the Reynolds number of the flow.

A typical and preferred family of functions, $f(p,m_k)$ for a circular cross section conveyance is:

$$f(p,m_k) = 5.6\, V_\tau(m_k) \left[ 1 + \log \frac{(R-p)\, V_\tau(m_k)}{\eta} \right] \text{ where}$$

$V_\tau$ is an empirically determined pseudo-velocity near the conveyance wall which depends on the Reynolds number of the fluid, $\eta$ is the viscosity of the fluid, p is the distance from the center of the pipe, and R is the radius of the pipe. An alternate function is:

$$f(p,m_k) = V(m_k)\, [R^2 - p^2]$$

where $V(m_k)$ is the velocity at the pipe center as a function of the Reynolds number, R is the radius of the pipe, and p is a radial distance from the pipe center.

The family of functions chosen to describe the flow profile is preferably based upon known experimental results. To determine the constants $A_{j,k}$, the acoustical time measurements along each flow path 44, 46, 48 and 50 are made and recorded, and the results are used to determine according to Equation 1 above, the measured average flow velocity, $v_{meas(i)p}$, along the respective path. Thereafter, the average velocities, $v_{meas(i)p}$, are equated respectively to the "exact equation" for the average velocity along the respective paths determined by integrating Equation 2 along the paths $P_i$. There results a family of simultaneous linear equations:

$$\overline{v}_{meas(i)p} = \sum_{j,k} A_{j,k}/PL_i \int_{P_i} f(p,m_k)\, dp \qquad \text{(EQUATION 3)}$$

where $v_{meas(i)p}$ is the determined average velocity along the $i^{th}$ path, $P_i$ defines the $i^{th}$ path, $PL_i$ is the length of the $i^{th}$ path, and the integral over $P_i$ is a line integral along the path $P_i$. This system of simultaneous equations can be solved for the $A_{j,k}$, so long as the number of paths is at least equal to the number of functions $f_j(p,m_k)$. Thus, the multiplicative product of j and k must be no greater than the number of available paths, $P_i$.

With respect to the particular geometric configuration shown in the FIGS. 1 and 2, and converting p to an x,y coordinate system, and assuming that each path is parallel to the X—Z plane and that $f_j(x,y,m_k) = f_j(-x,y,m_k)$, the system of simultaneous equations reduces to:

$$\overline{v}_{meas(i)} = \sum_{j,k} \frac{A_{j,k}}{(R^2 - y_i^2)^{\frac{1}{2}}} \int_0^{(R^2-y_i^2)^{\frac{1}{2}}} f_j(x,y,m_k)\, dx \qquad \text{(EQUATION 4)}$$

where $y_i$ is the distance of the $i^{th}$ path from the X—Z plane 40 and $v_{meas(i)}$ is the longitudinal flow velocity defined by Equation 1A.

After solving the set of simultaneous equations for the unknown constants $A_{j,k}$, the actual fluid flow velocity across a plane normal to the flow can be accurately characterized by Equation 2. The average flow velocity across the entire area of the conveyance can then be written as:

$$\overline{V}_{area} = \sum_{j,k} \frac{A_{j,k}}{\text{Area}} \int_A f_j(p,m_k)\, dp \qquad \text{(EQUATION 5)}$$

which reduces (converting p to an x,y coordinate system), for the configuration of FIGS. 1 and 2, to $$\overline{V}_{area} = \sum \frac{A_{j,k}}{\pi R^2} \int_A f_j(x,y,m_k)\, dx\, dy \qquad \text{(EQUATION 6)}$$

where the integrals in Equations 5 and 6 are taken over the entire area of the pipeline, "Area" in Equation 5 is the numerical value of the cross-sectional area of the conveyance, and R is the inside radius of the pipeline of FIGS. 1 and 2.

In the most general case, $m_k$ will be a function of the Reynolds number of the fluid passing through the conveyance. Since the Reynolds number is dependent in part upon velocity, the procedure described above may be used iteratively by first approximating the Reynolds number according to either an estimated or a first rough guess at velocity, then calculating the average flow rate through the conveyance using the method described above, and then recalculating the flow rate using a revised, more accurate Reynolds number based upon the flow rate determined during the first iterative step. This approach, if the functions $f_j(p,m_k)$ are selected with some care and reflect the actual dynamics of the flow system, should quickly converge to a highly accurate value of average velocity.

Figure 3:
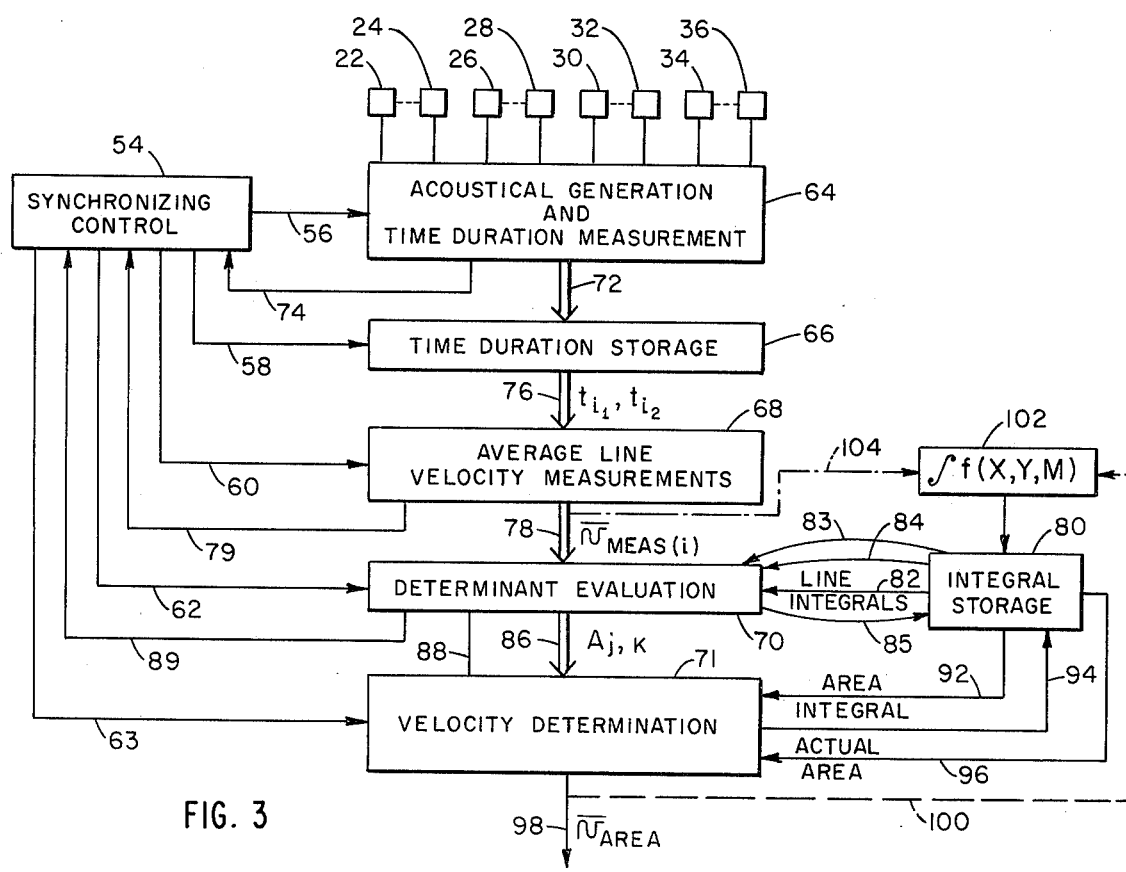
FIG. 3 is an electrical schematic block diagram of a typical electrical apparatus for measuring the volumetric flow.

Referring now to the electrical block diagram of FIG. 3, an apparatus for implementing the method described above comprises a synchronizing control element 54 which connects respectively over lines 56, 58, 60, 62 and 63 to an acoustical generation and time duration measurement element 64, a time duration storage register 66, an average line velocity measurement and storage circuitry 68, a determinant evaluation circuitry 70, and a velocity determination circuitry 71. The illustrated circuitry automatically initiates and completes a velocity determination in a fixed time duration, an earlier determination being completed before the next velocity determination is initiated. In other embodiments of the invention, different automatic or manual timing procedures can be implemented.

Upon initiation of a velocity determination, the synchronizing control element 54 actuates the acoustical generation and time duration measurement circuitry to sequentially measure the upstream and downstream transit times of an acoustical pulse signal between each of the transducer pairs: 22-24, 26-28, 30-32, 34-36. The measurements are preferably made sequentially to minimize cross-talk and the possible misinterpretation of the received signals because of that interference.

The resulting time duration measurements are provided sequentially by the circuitry 64 to the time duration storage register 66 over lines 72. Thus, for example, in the illustrated embodiment, a measurement is made between one of the transducer pairs every five milliseconds under the control of timing signals from element 54 over line 56. When the results of that time duration measurement are available over lines 72, as indicated by an enable signal over line 74 to the synchronization element 54, the synchronizing control element, over lines 58, initiates storage of the result in a selected location of storage register 66.

After all of the measurements have been made (eight measurements in the illustrated embodiment) and stored in storage register 66, signals representing the stored measurements of the time durations are available over lines 76 to the average line velocity measurement circuitry 68. The illustrated circuitry 68 is a hardware element and contains an arithmetic processor to determine, from each pair of upstream and downstream measurements for a transducer pair, according to Equation 1 above, the average measured fluid flow velocity, $v_{meas(i)p}$, along each path, "i". Circuitry 68, in response to a control signal from the synchronization element 54 over line 60, initiates the average velocity determination and the results of the determination are stored in the circuitry 68 and are available to the determinant evaluation circuitry 70 over lines 78. Velocity measurement circuitry 68 also provides a signalling level over a line 79 to synchronization element 54 when the output data over lines 78 are valid.

The determinant evaluation circuit or element 70 receives inputs from the average line velocity measurement circuitry 68 over lines 78 and also receives additional data from an integral storage register 80 over lines 82. The circuitry 70 is designed, as is well known in the art, to solve the system of simultaneous linear equations of Equation 3 for the $A_{j,k}$. The integral storage register 80 receives and stores data representing (1) the line integral of each of the selected functions $f_j(p,m_k)$ over each of the selected paths, 44, 46, 48, 50, required by Equation 3; (2) the integral of $f_j(p,m_k)$ over the entire cross-sectional area required by Equation 5; (3) the path lengths; (4) the cross-sectional area of the conveyance; and (5) the value $\cos \theta_i$ required in Equation 1A. The line integrals, the path lengths and the values of $\cos \theta_i$ are made available to determinant evaluation circuitry 70 over lines 82, 83 and 84, respectively in response to an interrogation signal from circuitry 70 on lines 85. The interrogation signal identifies the path for which information is required.

In response to an enabling signal over a line 62 from the synchronizing control unit 54, the determinant evaluation circuitry determines the values of the $A_{j,k}$, stores them, and makes them available over lines 86 in response to an interrogation signal from the velocity determination circuitry 71 over lines 88. The interrogation signal over lines 88 identifies the $A_{j,k}$ required. Circuitry 70 also places a signalling level on a line 89 to indicate to a synchronization element that the evaluation cycle is complete and that the $A_{j,k}$ are available.

The velocity determination circuitry 71 is thereafter enabled by an enabling signal from the synchronization control element 54 over line 63. In response to the enabling signal over line 63, the velocity determination circuitry 71, which may be incorporated into the programmed portion of a general purpose digital computer, interrogates the determinant evaluation circuitry for the $A_{j,k}$, and evaluates Equation 5 for the average flow velocity across a plane normal to the fluid flow. To complete the evaluation according to Equation 5, the velocity determination circuitry receives over lines 92 in response to an interrogation signal over a line 94, the value of the area integral identified in Equation 5. Another data input to the velocity determination circuitry over lines 96 from storage 80 provides the actual cross-sectional area of conveyance 12. The output of the velocity determination circuitry over lines 98 is the average measured flow velocity across a plane normal to fluid flow through the conveyance.

The numbers stored in the storage registers 80 may be manually entered, for example from a manual calculation, or may be loaded from a general purpose computer, appropriately programmed to provide the required data. Where the synchronization element is configured to repetitively perform the determination of average flow velocity for the conveyance, for example, once every second, it is desirable to implement the iterative procedure noted above and provide a feedback path 100 from the velocity determination circuitry output 98 to an element 102 for more precisely selecting the fluid flow approximating functions $f_j(p,m_k)$. Alternately, the function $f_j(p,m_k)$ can be selected after the measured average velocities are determined by circuitry 68. This is indicated by dot-dashed line 104.

As would be obvious to those skilled in the art, the hardware system shown in FIG. 3 can be implemented in part or in whole using a special or appropriately programmed general purpose digital computer. Thus, various trade-offs are available between the hardware and software systems; and a satisfactory trade-off should consider both cost, speed, and convenience.

Various additions, subtractions, deletions and other modifications of the preferred embodiment of the invention will be obvious to those skilled in the art and are within the scope of the following claims.

What is claimed is:

1. A method for determining average fluid velocity across a reference plane of a fluid conveyance comprising the steps of selecting a plurality of functions $f_j(p,m_k)$, which each represent an approximation of the flow velocity profile $P(p)$ of fluid traversing said reference plane, where p defines a position in said plane and each $m_k$ is a function of the Reynolds number;

approximating the flow velocity profile by a linear combination of said functions, said combination being of the form $$P(p) = \sum_{j,k} A_{j,k} f_j(p,m_k)$$

where each $A_{j,k}$ is an unknown scalar constant and j and k are positive integers over which the summation is taken;

measuring the time durations for acoustical sounds to travel upstream and downstream along each of a plurality of straight line paths, each path extending between an upstream wall position of said fluid conveyance and a downstream wall position of the conveyance, the number of known paths being not less than the multiplicative product of j and k;

determining a measured average fluid flow velocity, vel. meas(i), for each path from the measured time durations;

determining said unknown constants $A_{j,k}$ by forming a system of simultaneous equations having the form $$\text{vel. meas}(i) = \int_{P_i} \frac{P(p)dp}{PL_i} = \sum_{j,k} \frac{A_{j,k}}{PL_i} \int_{P_i} f_j(p,m_k)dp$$

where $PL_i$ is the length of the $i^{th}$ path, $P_i$ defines the $i^{th}$ known path and $P_i$ is the line integral along the path $P_i$, and solving said system of simultaneous equations for said $A_{j,k}$ by evaluating said line integrals along said flow paths,
substituting the known values for vel. meas(i) and $PL_i$, and
solving for the constants $A_{j,k}$;
determining average flow V across said plane by evaluating the equation $$\overline{V} = \sum_{j,k} \frac{A_{j,k}}{PA} \int_{area} f_j(p,m_k)dp$$

where PA is the area of the reference plane bounded by said conveyance and the integral is taken over the entire area of the reference plane bounded by the fluid conveyance.

2. The method of claim 1 wherein said fluid conveyance has a circular cross section of inside radius R, said paths lie in parallel planes, said simultaneous equations can be reduced to the form $$\overline{v}_{meas(i)} = \sum_{j,k} A_{j,k} \frac{1}{(R^2 - y_i^2)^{\frac{1}{2}}} \int_0^{(R^2 - y_i^2)^{\frac{1}{2}}} f_j(x,y_i,m_k)dx$$

where $y_i$ is the distance of the $i^{th}$ path from a central reference plane parallel to said parallel planes and passing through a center flow axis of the tubular member, and $v_{meas(i)}$ is the measured average longitudinal flow velocity for the $i^{th}$ path, and
said average velocity V can be written, $$\overline{V} = \sum_{j,k} A_{j,k} \frac{1}{\pi R^2} \int_{area} f_j(x,y,m_k)\,dx\,dy.$$

3. The method of claim 2 wherein the $f_j(p,m_k)$ comprise:

$$f(p,m_k) = 5.6\, V_T(m_k) \left[ 1 + \log \frac{(R-p)\,V_T(m_k)}{\eta} \right] \text{ where}$$

$V_T$ is an empirically determined pseudo-velocity near the conveyance wall which depends on the Reynolds number of the fluid, $\eta$ is the viscosity of the fluid, p is the distance from the center of the conveyance, and R is the radius of the conveyance.

4. The method of claim 2 including the step of selecting said paths at unequal distances from said central reference plane.

5. The method of claim 1 including the steps of
reselecting said plurality of functions based upon a previously determined average flow velocity, V, and
determining said average flow velocity, V, for said conveyance based upon said reselected functions.

6. The method of claim 1 wherein said solving step comprises solving said system of simultaneous equations using a determinant solution process.

7. The method of claim 1 wherein said function selecting step depends upon the average measured flow velocities, vel. meas(i).

8. An apparatus for determining average fluid flow velocity across a reference plane of a fluid conveyance comprising
a plurality of transducer pairs, each transducer being positioned in the boundary walls of said fluid conveyance for emitting and for receiving acoustical signals, and each transducer pair spanning a longitudinal section of said conveyance,
a synchronizing control element for selectively operating said transducer pairs for producing generated acoustical signals for each said transducer in a predetermined sequence and for receiving said acoustical signals with the transducer associated with the transmitting transducer,
means for repeatedly measuring an upstream and a downstream transit time duration for each transducer associated pair and determining, from the upstream and downstream acoustic signal transit time durations for each transducer pair, a measure of average fluid flow velocity, vel. meas(i), for each straight line path associated with and extending between each of said associated transducer pairs,
means responsive to said measuring and determining means for solving a system of simultaneous equations having the general form $$\text{vel. meas}(i) = \sum_{j,k} A_{j,k} \frac{\int_{P_i} f_j(p,m_k)dp}{PL_i}$$

for the $A_{j,k}$, where $A_{j,k}$ are unknown scalar constants, $PL_i$ is the path length of the $i^{th}$ path between the $i^{th}$ pair of transducers, $f_j(p,m_k)$ represents a plurality of approximations of the flow velocity profile of fluid traversing said member where p is position in the reference plane, and $m_k$ is a function of the Reynolds number of the fluid, and the integral is a line integral taken along the $i^{th}$ straight line path, and
means response to said solving means for evaluating an equation of the form $$\overline{V} = \sum_{j,k} A_{j,k} \frac{1}{A} \int_{Area} f_j(p,m_k)dp$$

where V is the average velocity across the reference plane normal to the fluid flow path, A is the cross-sectional area of the conveyance, and the integral is taken across the area of the conveyance,
whereby the average fluid flow velocity across the reference plane is determined.

9. The apparatus of claim 8 wherein said straight line paths lie in parallel planes and said parallel planes are parallel to a longitudinal reference plane passing through a center flow axis of the fluid conveyor.

10. The apparatus of claim 9 wherein
said fluid conveyance has a circular internal cross section, and
said planes are spaced unequal distances from said reference plane.

11. The apparatus of claim 9 wherein said fluid conveyance is a pipe having a circular internal cross section, and
said functions $f_j(p,m_k)$ comprise:

$$f(p,m_k) = 5.6\, V_T(m_k)\left[ 1 + \log \frac{(R-p)\,V_T(m_k)}{\eta} \right] \text{ where}$$

$V_T$ is an empirically determined pseudo-velocity near the conveyance wall which depends on the Reynolds number of the fluid, $\eta$ is the viscosity of the fluid, p is the distance from the center of the pipe, and R is the radius of the pipe.

12. The apparatus of claim 9 wherein each transducer pair has an upstream transducer and a downstream transducer, and said upstream transducers lie in a first plane, said downstream transducers lie in a second plane, and said first and second planes are parallel.

13. The apparatus of claim 8 further comprising means for reevaluating said $A_{j,k}$ based upon a previously determined value of average fluid flow velocity, V.

14. The apparatus of claim 8 further comprising means for reselecting said $f_j(p,m_k)$ based upon said measured average velocities, vel. meas(i).

* * * * *

UNITED STATES PATENT AND TRADEMARK OFFICE
CERTIFICATE OF CORRECTION

PATENT NO. : 4,300,401

DATED : November 17, 1981

INVENTOR(S) : Norman E. Pedersen

It is certified that error appears in the above-identified patent and that said Letters Patent are hereby corrected as shown below:

Column 1, line 13, "v" should be --$\bar{v}$--.

Column 1, line 14, "v" should be --$\bar{v}$--.

Column 3, line 15, "v" should be --$\bar{v}$--.

Column 4, line 35, "v" should be --$\bar{v}$--.

Column 4, line 57, "v" should be --$\bar{v}$--.

Column 5, line 28, "v" should be --$\bar{v}$--.

Column 5, line 29, "v" should be --$\bar{v}$--.

Column 5, line 39, "v" should be --$\bar{v}$--.

Column 5, line 61, "v" should be --$\bar{v}$--.

Column 7, line 11, "v" should be --$\bar{v}$--.

Claim 1, column 8, line 65, "$P_i$" should be --$\int_{P_i}$--.

UNITED STATES PATENT AND TRADEMARK OFFICE
CERTIFICATE OF CORRECTION

PATENT NO. : 4,300,401

DATED : November 17, 1981

INVENTOR(S) : Norman E. Pedersen

It is certified that error appears in the above-identified patent and that said Letters Patent are hereby corrected as shown below:

Claim 1, column 9, line 6, "V" should be --$\bar{V}$--.

Claim 2, column 9, line 30, "V" should be --$\bar{V}$--.

Claim 5, column 9, line 53, "V" should be --$\bar{V}$--.

Claim 5, column 9, line 55, "V" should be --$\bar{V}$--.

Claim 8, column 10, line 40, "Area" should be --$\int_{Area}$--.

Claim 8, column 10, line 41, "V" should be --$\bar{V}$--.

Claim 13, column 12, line 5, "V" should be --$\bar{V}$--.

Signed and Sealed this

Twentieth Day of April 1982

[SEAL]

Attest:

GERALD J. MOSSINGHOFF

Attesting Officer  Commissioner of Patents and Trademarks